US009501109B2

(12) United States Patent
Cho et al.

(10) Patent No.: US 9,501,109 B2
(45) Date of Patent: Nov. 22, 2016

(54) DETACHABLE GUIDING MECHANISM AND RELATED ELECTRONIC DEVICE

(71) Applicant: Wistron Corporation, New Taipei (TW)

(72) Inventors: Shih-Huai Cho, New Taipei (TW); Yi-Yu Chang, New Taipei (TW); Yu-Han Chen, New Taipei (TW); Yi-He Huang, New Taipei (TW)

(73) Assignee: Wistron Corporation, New Taipei (TW)

( * ) Notice: Subject to any disclaimer, the term of this patent is extended or adjusted under 35 U.S.C. 154(b) by 76 days.

(21) Appl. No.: 14/523,940

(22) Filed: Oct. 26, 2014

(65) Prior Publication Data

US 2015/0359138 A1    Dec. 10, 2015

(30) Foreign Application Priority Data

Jun. 10, 2014  (TW) ............................. 103120064 A

(51) Int. Cl.
*H05K 7/20* (2006.01)
*G06F 1/18* (2006.01)
*G06F 1/20* (2006.01)

(52) U.S. Cl.
CPC ................. *G06F 1/185* (2013.01); *G06F 1/20* (2013.01)

(58) Field of Classification Search
CPC ......... H05K 5/0286; H05K 7/20; H05K 5/02
USPC ................. 361/679.51, 692, 679.01
See application file for complete search history.

(56) References Cited

U.S. PATENT DOCUMENTS 4,345,607 A * 8/1982 Contreras .............. A45C 11/24
16/227

5,077,601 A * 12/1991 Hatada .................. H01L 23/467
165/80.3

(Continued)

FOREIGN PATENT DOCUMENTS

TW    201328574    7/2013

OTHER PUBLICATIONS

STIC Search.*

(Continued)

*Primary Examiner* — Dion R Ferguson
*Assistant Examiner* — Mandeep S Buttar
(74) *Attorney, Agent, or Firm* — Winston Hsu; Scott Margo

(57) ABSTRACT

A detachable guiding mechanism is selectively disposed inside an electronic device and located above a half-height expansion card of the electronic device. The detachable guiding mechanism includes a bridging component and a guiding component. The bridging component includes at least one connecting portion. The guiding component is detachably assembled with the bridging component. The guiding component includes a contacting surface, a first guiding surface, a second guiding surface and at least one fixing portion. The contacting surface contacts against or abuts adjacent to an upper edge of the half-height expansion card since the detachable guiding mechanism is located above the half-height expansion card. The first guiding surface and the second guiding surface are connected to the contacting surface to respectively form a first angle and a second angle. The fixing portion is disposed on the connecting portion to detachably assemble the guiding component with the bridging component.

26 Claims, 7 Drawing Sheets

(56) References Cited

U.S. PATENT DOCUMENTS

| | | | | |
|---|---|---|---|---|
| 5,734,551 | A * | 3/1998 | Hileman | G06F 1/184 361/695 |
| 7,542,289 | B2 | 6/2009 | Tsai | |
| 8,300,409 | B2 * | 10/2012 | Wei et al. | F15D 1/0005 361/689 |
| 2007/0236882 | A1 * | 10/2007 | Chen | H05K 7/20154 361/695 |
| 2010/0020487 | A1 * | 1/2010 | Lee | G06F 1/185 361/679.49 |
| 2010/0165568 | A1 | 7/2010 | Tsai | |
| 2011/0317359 | A1 | 12/2011 | Wei | |
| 2013/0163191 | A1 | 6/2013 | Chen | |

OTHER PUBLICATIONS

Office Action mailed on Jun. 22, 2015 for the Taiwan application No. 103120064, filing date: Jun. 10, 2014, p. 1 line 1~14, p. 2~3 and p. 4 line 1~19.

* cited by examiner

DETACHABLE GUIDING MECHANISM AND RELATED ELECTRONIC DEVICE

BACKGROUND OF THE INVENTION

1. Field of the Invention

The present invention relates to a guiding mechanism, and more particularly, to a detachable guiding mechanism and a related electronic device capable of changing direction of the fan's airflow to increase heat dissipating efficiency of an expansion card.

2. Description of the Prior Art

Operational efficiency and function of an electronic product are increased with the advanced technology, and the electronic product usually has a plurality of expansion cards to conform to application demand. Heat generated by the computer device is accordingly increased since an amount of the expansion card increases and operational efficiency of the expansion card is enhanced. The computer device includes a fan unit disposed inside the casing to generate airflow to cool the expansion card, so as to dissipate the heat generated by the computer device and to prevent the computer device from crash. The conventional expansion card includes a full-height expansion card and a half-height expansion card according to its dimension. A height of the half-height expansion card is lower than a height of the full-height expansion card. When the full-height expansion card and the half-height expansion card are arranged on the circuit board in parallel, a gap is formed by height difference, which exists between an upper edge of the half-height expansion card and a lateral side of the full-height expansion card, the airflow from the fan unit mostly passes through the gap, and temperature of the half-height expansion card cannot be effectively decreased.

There are several conventional solutions applied to overcome overheat of the half-height expansion card. One of the conventional solutions increases rotation speed of the fan unit to compensate loss of the heat dissipating efficiency because due to airflow bypass; however, the foresaid solution has drawbacks of energy waste and expensive cost. Another conventional solution constrains types of the expansion card, which means parallel arrangement of the half-height expansion card and the full-height expansion card is forbidden, and has drawbacks of design difficulty and limited functional expansion. A metal elastic piece or an elastic rubber is utilized to shelter the gap and to adjust the airflow's direction in the conventional solutions. Resilience of the metal elastic piece and the elastic rubber are easily deteriorated by high temperature environment because of long-term usage, and the gap cannot be fully sheltered due to elastic fatigue of the metal elastic piece and/or the elastic rubber.

SUMMARY OF THE INVENTION

The present invention provides a detachable guiding mechanism and a related electronic device capable of changing direction of the fans' airflow to increase heat dissipating efficiency of an expansion card for solving above drawbacks.

According to the claimed invention, a detachable guiding mechanism is selectively disposed inside an electronic device and accordingly located above at least one half-height expansion card of the electronic device. The detachable guiding mechanism includes a bridging component and at least one guiding component. The bridging component includes at least one connecting portion. The guiding component is detachably assembled with the bridging component. Each of the at least one guiding component includes a contacting surface, a first guiding surface, a second guiding surface and at least one fixing portion. The contacting surface is adapted to contact against or abut adjacent to an upper edge of the half-height expansion card when the detachable guiding mechanism is located above the half-height expansion card. The first guiding surface is connected to a first side of the contacting surface, and a first angle is formed between the first guiding surface and the contacting surface. The second guiding surface is connected to a second side of the contacting surface opposite to the first side, and a second angle is formed between the second guiding surface and the contacting surface. The fixing portion is jointed to the at least one connecting portion to detachably assemble the guiding component with the bridging component.

According to the claimed invention, an electronic device includes a casing, a circuit board, a fain unit and a detachable guiding mechanism. The circuit board is disposed inside the casing. At least one expansion card inserts into and is electrically connected to at least one connector of the circuit board selectively. The expansion card is a full-height expansion card or a half-height expansion card. The fan unit is disposed inside the casing and operatively generating airflow inside the casing. The airflow has an inlet direction and an outlet direction. The detachable guiding mechanism is disposed above the expansion card. The detachable guiding mechanism includes a bridging component and at least one guiding component. The bridging component is directly or indirectly disposed on the casing. The bridging component includes at least one connecting portion. The guiding component is detachably assembled with the bridging component. Each of the at least one guiding component includes a contacting surface, a first guiding surface, a second guiding surface and at least one fixing portion. The contacting surface is adapted to contact against or abut adjacent to an upper edge of the half-height expansion card when the expansion card equals the half-height expansion card. The first guiding surface is connected to a first side of the contacting surface, and a first angle is formed between the first guiding surface and the contacting surface. The second guiding surface is connected to a second side of the contacting surface opposite to the first side, and a second angle is formed between the second guiding surface and the contacting surface. The fixing portion is jointed to the at least one connecting portion to detachably assemble the guiding component with the bridging component. The guiding component is disposed above the half-height expansion card to block the airflow and further to guide the airflow for passing through a lateral surface of the half-height expansion card, so as to increase heat dissipating efficiency of the half-height expansion card.

The present invention is suitable for parallel arrangement of the full-height expansion card and the half-height expansion card to economize energy consumption of the fan unit, and the heat dissipating efficiency is not decreased due to the resilient fatigue which results in long-term usage.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
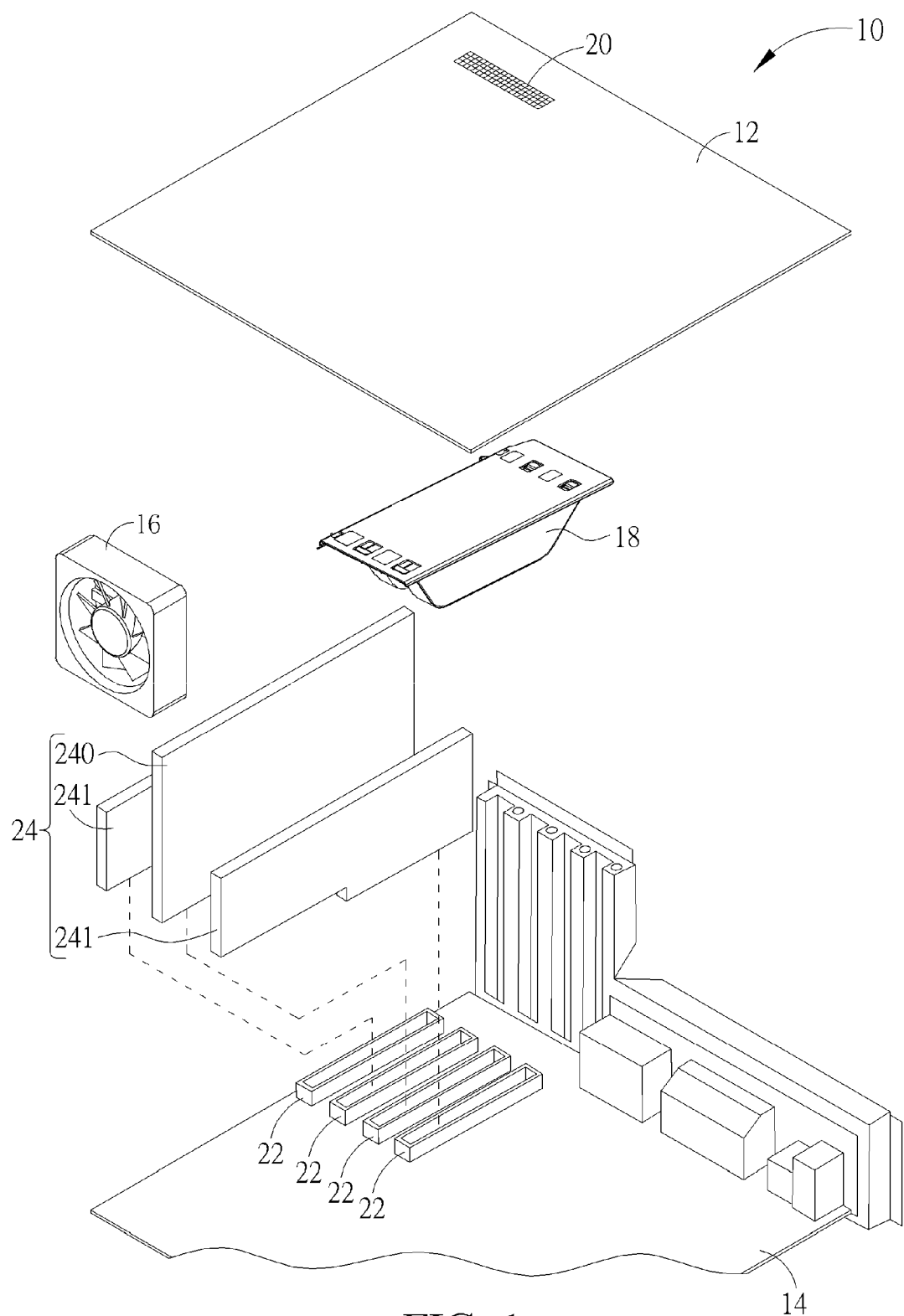
FIG. 1 is an exploded diagram of an electronic device according to a first embodiment of the present invention.
Figure 2:
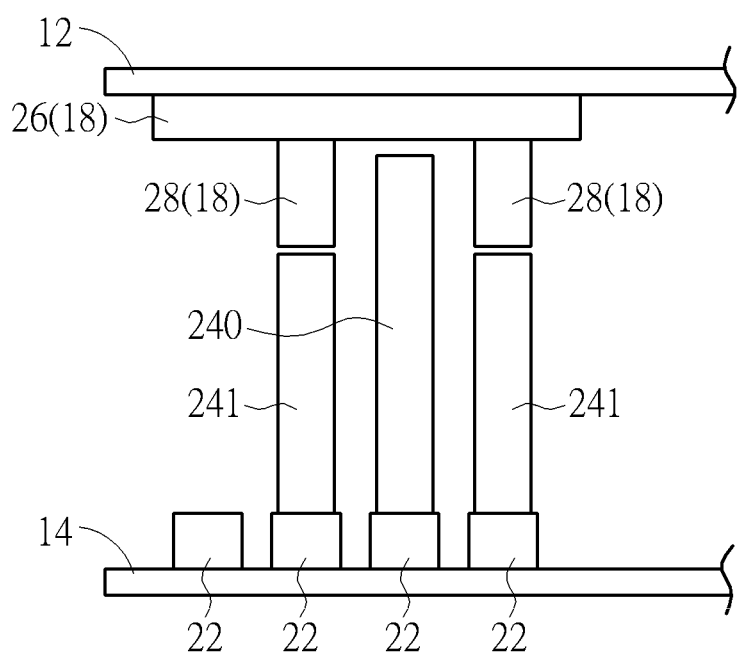
FIG. 2 is a lateral view of the electronic device according to the first embodiment of the present invention.

Please refer to FIG. 1 and FIG. 2. FIG. 1 is an exploded diagram of an electronic device 10 according to a first embodiment of the present invention. FIG. 2 is a lateral view of the electronic device 10 according to the first embodiment of the present invention. The electronic device 10 includes a casing 12, a circuit board 14, a fan unit 16 and a detachable guiding mechanism 18. An opening 20 is formed on a surface of the casing 12. The circuit board 14 is disposed inside the casing 12. The circuit board 14 has a plurality of connectors 22 for connecting with at least one expansion card 24. The expansion card 24 includes a full-height expansion card 240 and a half-height expansion card 241, and a height of the full-height expansion card 240 is greater than a height of the half-height expansion card 241. A large gap is formed between the casing 12 and an upper edge of the half-height expansion card 241 shown in FIG. 1. The detachable guiding mechanism 18 can be disposed within the foresaid gap. The fan unit 16 is disposed on or inside the casing 12 accordingly to generate airflow flowing into the casing 12. The cool airflow is inhaled into the casing 12 at an inlet direction and the hot airflow is exhausted from the opening 20 at an outlet direction. A heat generating component is disposed on a lateral surface of the expansion card 24. The foresaid gap above the half-height expansion card 241 is blocked by the detachable guiding mechanism 18, the airflow generated by the fan unit 16 is transferred to pass through lateral space between the adjacent full-height expansion card 240 and the half-height expansion card 241, and the heat of the heat generating component can be dissipated to increase heat dissipating efficiency of the expansion card 24.

Figure 3:
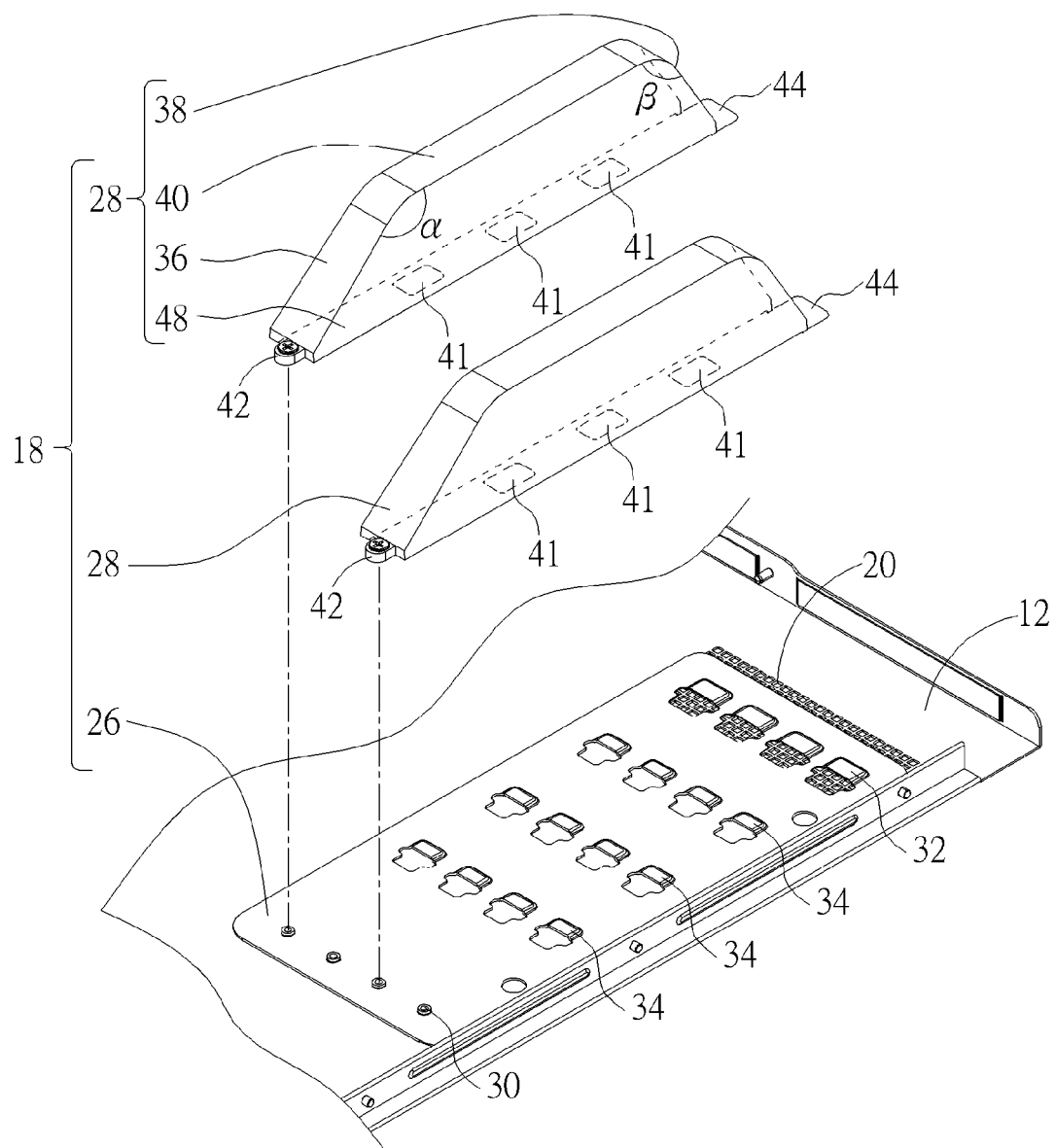
FIG. 3 is a diagram of a detachable guiding mechanism according to the first embodiment of the present invention.

Please refer to FIG. 1 to FIG. 3. FIG. 3 is a diagram of the detachable guiding mechanism 18 according to the first embodiment of the present invention. The detachable guiding mechanism 18 includes at least one bridging component 26 and a plurality of guiding components 28. The bridging component 26 preferably can be a metal thin plate disposed on the casing 12 directly or indirectly via a rivet or a screw. The bridging component 26 and the casing 12 can be independent components detachably assembled with each other. Further, the bridging component 26 can be a part of the casing 12, which means the bridging component 26 is integrated with the casing 12 monolithically. The bridging component 26 includes at least one first connecting portion 30, at least one second connecting portion 32 and a plurality of third connecting portions 34 with different forms. When the bridging component 26 is assembled with the casing 12, the first connecting portion 30 is located adjacent to the inlet direction, the second connecting portion 32 is located adjacent to the outlet direction, the third connecting portions 34 are located between the first connecting portion 30 and the second connecting portion 32.

As shown in FIG. 3, each of the bridging components 26 can include one first connecting portion 30, one second connecting portion 32 and three third connecting portions 34. Amounts of the first connecting portion 30, the second connecting portion 32 and the third connecting portion 34 are not limited to the above-mentioned embodiment. For example, an amount of the third connecting portion 34 of the each bridging component 26 is designed according to a length of the guiding component 28, and an amount of the connecting portion 30, 32, 34 of the each bridging component 26 is designed according to an amount of the guiding component 28.

An amount of the guiding component 28 is designed according to an amount of the half-height expansion card 241. When the full-height expansion card 240 inserts into the connector 22, there is no gap formed between the full-height expansion card 240 and the casing 12 (or the gap is tiny and can be ignored), the airflow generated by the fan unit 16 passes through the lateral surface of the full-height expansion card 240 to dissipate the heat, so that the guiding component 28 is not disposed above the full-height expansion card 240. When the half-height expansion card 241 inserts into the connector 22, the large gap is formed between the half-height expansion card 241 and the casing 12, the guiding component 28 is disposed above the half-height expansion card 241 to block the flow channel (such as the foresaid large gap), and the airflow generated by the fan unit 16 can be transferred to pass through the lateral surface of the half-height expansion card 241. Thus, the guiding component 28 is detachably assembled with the bridging component 26. The amount/position of the guiding component 28 can be set by use's demand according to arrangement of the full-height expansion card 240 and/or the half-height expansion card 241.

The guiding component 28 can be a solid trapezoid structure or a hollow trapezoid structure. The guiding component 28 includes a first guiding surface 36, a second guiding surface 38, a contacting surface 40 and a fixing surface 48. The contacting surface 40 is horizontally opposite to the fixing surface 48. The first guiding surface 36 and the second guiding surface 38 are respectively connected to opposite sides of the contacting surface 40. A first angle α is immovably formed between the contacting surface 40 and the first guiding surface 36. A second angle β is immovably formed between the contacting surface 40 and the second guiding surface 38. The first guiding surface 36 (and the second guiding surface 38) cannot resiliently deformed relative to the contacting surface 40, and the first angle α between the contacting surface 40 and the first guiding surface 36 and the second angle β between the contacting surface 40 and the second guiding surface 38 are constant values. In the first embodiment, the first angle α is greater than the second angle β, which means an inclined angle (the first angle α) of the first guiding surface 36 (facing at the inlet direction) relative to the contacting surface 40 is larger than the second angle β. In another embodiment, the contacting surface 40 can be minimized and ignored. The first guiding surface 36, the second guiding surface 38 and the fixing surface 48 are connected to form a triangular shape or a shape similar to the triangle, and the contacting surface 40 is a corner of the triangular shape or the shape similar to the triangle. When the guiding component 28 is assembled with the bridging component 26, a first fixing portion 42 disposed on a side of the fixing surface 48 (or a side of the first guiding surface 36) is jointed to the first connecting portion 30, a second fixing portion 44 disposed on the other side of the fixing surface 48 (or a side of the second guiding surface 38) is jointed to the second connecting portion 32, and the guiding component 28 can be assembled with/disassembled from the bridging component 26 conveniently and rapidly by quick releasing design of the fixing portion and the connecting portion.

The guiding component 28 further includes a constraining portion 41 disposed on the fixing surface 48. The constraining portion 41 slidably inserts into the third connecting portion 34 to enhance assembly stability between the guiding component 28 and the bridging component 26. An amount of the constraining portion 41 corresponds to an amount of the third connecting portion 34, which is not limited to the embodiment shown in FIG. 3 and depend on actual demand. The third connecting portion 34 and the constraining portion 41 are selective design (which means the third connecting portion 34 and the constraining portion 41 are dispensable components).

Figure 4:
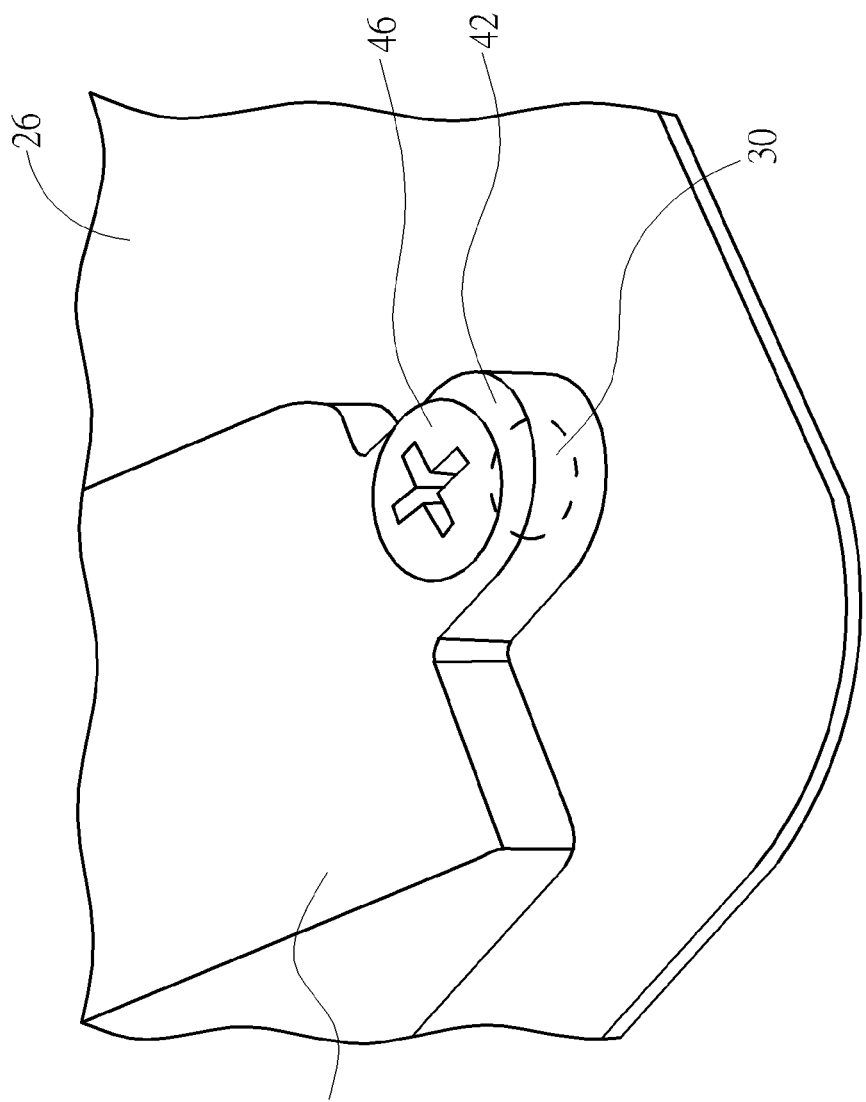
FIG. 4 is an assembly diagram of a first guiding surface and a first connecting portion according to the first embodiment of the present invention.
Figure 5:
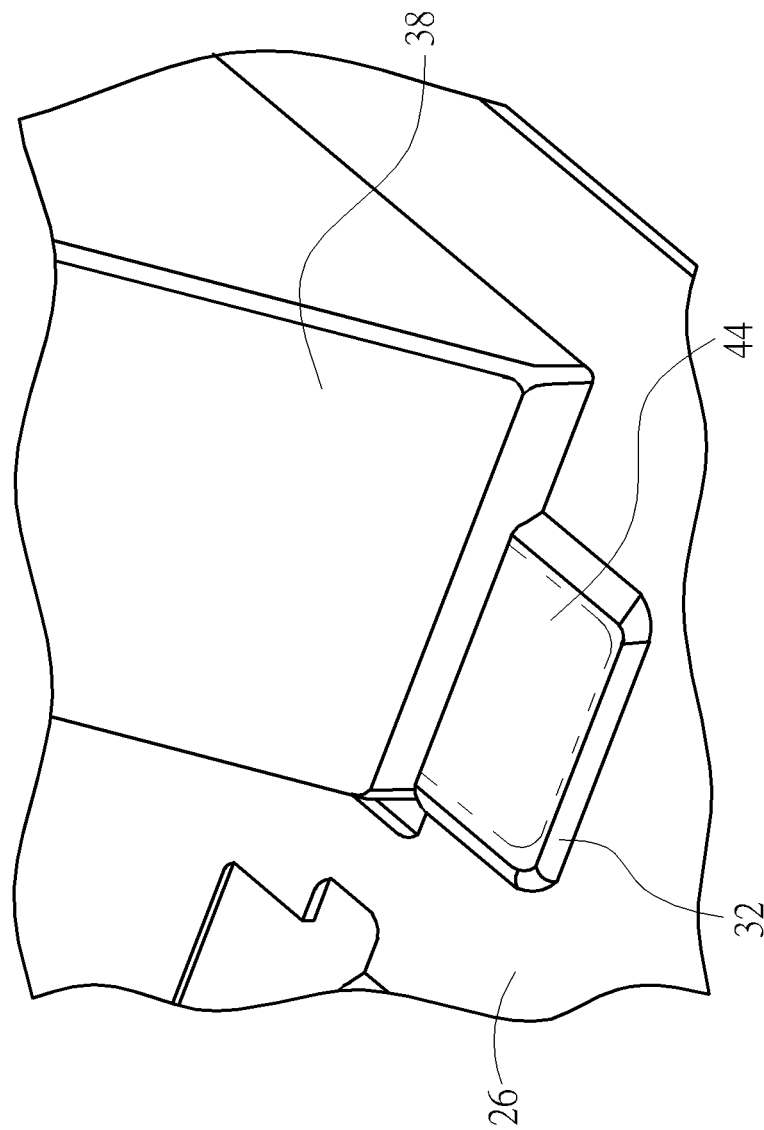
FIG. 5 is an assembly diagram of a second guiding surface and a second connecting portion according to the first embodiment of the present invention.

Please refer to FIG. 4 and FIG. 5. FIG. 4 is an assembly diagram of the first guiding surface 36 and the first connecting portion 30 according to the first embodiment of the present invention. FIG. 5 is an assembly diagram of the second guiding surface 38 and the second connecting portion 32 according to the first embodiment of the present invention. As shown in FIG. 4, the first connecting portion 30 is a locking hole structure, the first fixing portion 42 on the first guiding surface 36 is a piercing hole structure. The detachable guiding mechanism 18 utilizes a fixing component 46 (such as a screw or a bolt) to pass through the locking hole structure and the piercing hole structure so as to fix the first guiding surface 36 on the bridging component 26. As shown in FIG. 5, the second connecting portion 32 is a slot structure, and the second fixing portion 44 on the second guiding surface 38 is a protruding structure for slidably inserting into the slot structure. The second fixing portion 44 can firstably insert into the second connecting portion 32, and then the fixing component 46 is utilized to fix the first fixing portion 42 on the first connecting portion 30. Assembly sequence of the fixing portions and the connecting portions is not limited to the above-mentioned embodiment. Further, assembly procedure of the first connecting portion 30 and the first guiding surface 36, the second connecting portion 32 and the second guiding surface 38 are not limited to the above-mentioned design; for example, the connecting portion can be assembled with the guiding surface in a buckling/clamping manner.

As shown in FIG. 2, the guiding component 28 is located above the half-height expansion card 241 since the detachable guiding mechanism 18 is disposed inside the casing 12. When the airflow flows from the fan unit 16 to the half-height expansion card 241, the gap between the casing 12 and the upper edge of the half-height expansion card 241 is blocked by the guiding component 28. The inclined first guiding surface 36 guides the airflow (the cool airflow) to pass through the lateral surface (the lateral space formed between the half-height expansion card 241 and the adjacent expansion card 24) of the half-height expansion card 241. Meanwhile, the contacting surface 40 contacts against or abuts adjacent to the upper edge of the half-height expansion card 241, the airflow (gradually warmed up) may pass through the whole lateral surface of the half-height expansion card 241 instead of passing through the upper edge, and the heat of the half-height expansion card 241 can be effectively dissipated. The inclined second guiding surface 38 forms a flow channel leading toward the opening 20 to avoid turbulence, and the airflow (the hot airflow) can be rapidly exhausted from the casing via the opening 20 to effectively decrease environmental temperature inside the casing 12.

Figure 6:
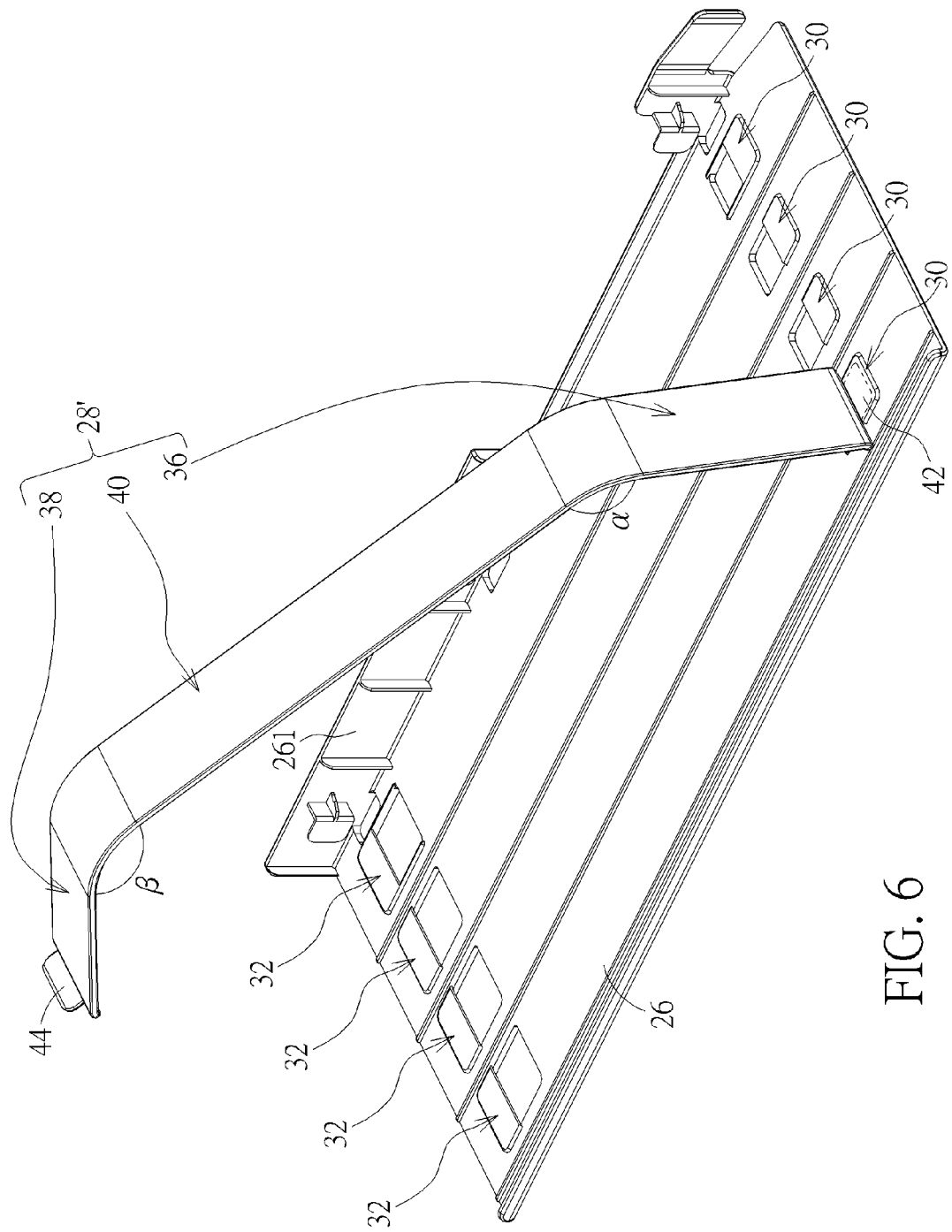
FIG. 6 is a diagram of the detachable guiding mechanism according to a second embodiment of the present invention.
Figure 7:
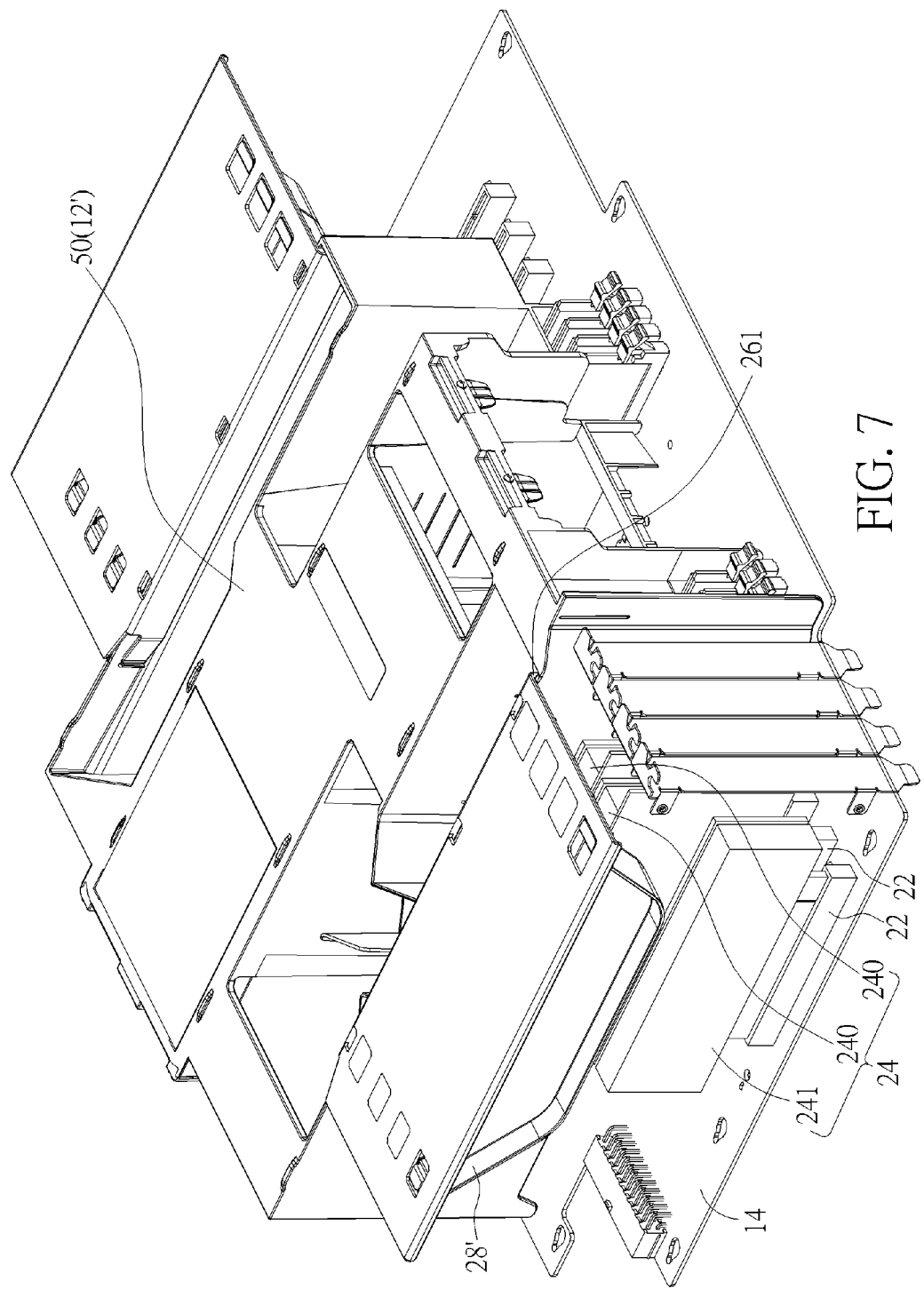
FIG. 7 is a diagram of the electronic device according to the second embodiment of the present invention.

Please refer to FIG. 6 and FIG. 7. FIG. 6 is a diagram of the detachable guiding mechanism 18' according to a second embodiment of the present invention. FIG. 7 is a diagram of the electronic device 10 according to the second embodiment of the present invention. In the second embodiment, elements having the same numeral as ones of the first embodiment have the same structure and function, and a detailed description is omitted herein for simplicity. The guiding component 28' is a striped structure with two corners and formed by three slab structures (including the first guiding surface 36, the second guiding surface 38 and the contacting surface 40). The opposite sides of the contacting surface 40 are respectively connected to the first guiding surface 36 and the second guiding surface 38. The first angle $\alpha$ and the second $\beta$ are accordingly formed between the contacting surface 40 and the first guiding surface 36 and the second guiding surface 38. The first guiding surface 36 (and/or the second guiding surface 38) of the second embodiment can slightly bend relative to the contacting surface 40 when an external force is applied to the detachable guiding mechanism 18', and the first guiding surface 36 (and/or the second guiding surface 38) can be resiliently recovered to an initial state when the external force is removed from the detachable guiding mechanism 18'. Therefore, the first angle a between the first guiding surface 36 and the contacting surface 40, and the second $\beta$ between the second guiding surface 38 and the contacting surface 40 are constant values since the external force is not applied, as mentioned above in the first embodiment.

As shown in FIG. 6, the first connecting portion 30 and the second connecting portion 32 can be designed as the slot structures, the first fixing portion 42 and the second fixing portion 44 can be designed as the protruding structures accordingly. For assembly of the guiding component 28' and the bridging component 26, the first fixing portion 42 slidably inserts into the first connecting portion 30, and the guiding component 28' is resiliently deformed by the external force to insert the second fixing portion 44 into the second connecting portion 32. Then, the external force is removed, a resilient recovering force of the guiding component 28' drives the first guiding surface 36 (and/or the second guiding surface 38) to bend relative to the contact surface 40 and toward the initial state, and the guiding component 28' can be stably disposed on the bridging component 26 to form a trapezoid shape as ones of the first embodiment.

In the second embodiment, the casing 12' includes a wind mask 50 with specific design. A shape of the wind mask 50 is designed according to arrangement of electronic components disposed inside the electronic device 10, and a detailed description is omitted herein for simplicity. A stretching portion 261 is disposed on a lateral side of the bridging component 26. The stretching portion 261 can be installed on the wind mask 50 by assembly of a protrusion and a slot, assembly of a screw and a thread hole or any quick releasing design. It is to say, the wind mask 50 is disposed by the expansion card 24, and the detachable guiding mechanism 18' is fixed on a side of the wind mask 50 to be located above the expansion card 24 and to contact against or abut adjacent to the casing 12'. As shown in FIG. 7, two full-height expansion cards 240 and one half-height expansion card 241 are disposed on the circuit board 14, and the foresaid half-height expansion card 241 is the small size card located on the left. Two inner connectors 22 of the circuit board 14 are electrically connected to the full-height expansion cards 240 without the guiding component. Height difference exists between the half-height expansion card 241 and the adjacent full-height expansion card 240, the gap is formed between the bridging component 26 (or a top of the casing 12') and the upper edge of the half-height expansion card 241, and the guiding component 28' is disposed above the half-height expansion card 241 and transfers the airflow to pass through the lateral surface of the half-height expansion card 241.

The full-height expansion card does not need the detachable guiding mechanism. The detachable guiding mechanism of the present invention can be disposed above the half-height expansion card in a convenient releasing manner according to actual demand. The guiding component of the detachable guiding mechanism is formed by connection of the first guiding surface, the second guiding surface and the contacting surface. The guiding component is preferably made by plastic material, such as PC (Polycarbonate) material and/or ABS (Acrylonitrile Butadiene Styrene) material to provide appropriate toughness and reliance. Comparing to the conventional metal elastic piece, the present invention can economize material cost and have isolation property, and the flow channel is not sheltered due to resilient fatigue. The first angle α located adjacent to the inlet direction is constant and greater than 90 degrees. The second angle β located adjacent to the outlet direction is preferably greater than 90 degrees (but not limited to) and smaller than the first angle α.

Value of the predetermined angles is designed according to parameters of the expansion card and the fan unit (such as the amount of the heat generating component and rotation speed of the fan unit). The angle greater than 90 degrees can guide the airflow to smoothly pass through the lateral surface of the expansion card and toward the opening on the casing. The contacting surface preferably can be the striped slab structure, which contacts against or abuts adjacent to the upper edge of the expansion card in a substantial parallel manner, to prevent the airflow from passing through the upper edge of the expansion card, and to ensure that the airflow can pass through the heat dissipating component disposed on the lateral surface of the expansion card for the preferred heat dissipating efficiency. Comparing to the prior art, the present invention is suitable for parallel arrangement of the full-height expansion card and the half-height expansion card to economize energy consumption of the fan unit, and the heat dissipating efficiency is not decreased due to the resilient fatigue which results in long-term usage.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A detachable guiding mechanism selectively disposed inside an electronic device and accordingly located above at least one half-height expansion card or full-height expansion card of the electronic device, the detachable guiding mechanism comprising:
   a bridging component, the bridging component comprising at least one connecting portion, and the at least one connecting portion having a third connecting portion; and
   at least one guiding component detachably assembled with the bridging component to form a first configuration and a second configuration of the detachable guiding mechanism, the guiding component comprising:
      a contacting surface, the contacting surface being adapted to contact against or abut adjacent to an upper edge of the half-height expansion card when the detachable guiding mechanism is located above the half-height expansion card;
      a first guiding surface connected to a first side of the contacting surface, a first angle being formed between the first guiding surface and the contacting surface;
      a second guiding surface connected to a second side of the contacting surface opposite to the first side, a second angle being formed between the second guiding surface and the contacting surface;
      at least one fixing portion jointed to the at least one connecting portion to detachably assemble the guiding component with the bridging component;
      a fixing surface opposite to the contacting surface; and
      at least one constraining portion disposed on the fixing surface and being jointed to the third connecting portion to detachably assemble the guiding component with the bridging component;
   wherein the guiding component is attached to the bridging component and above the half-height expansion card in the first configuration, and the guiding component is detached from the bridging component where the full-height expansion card is located in the second configuration.

2. The detachable guiding mechanism of claim 1, wherein the bridging component comprises a plurality of connecting portions arranged in juxtaposition, and the guiding component is selectively disposed on at least one of the plurality of connecting portions located relative to the half-height expansion card.

3. The detachable guiding mechanism of claim 1, wherein the first angle is substantially greater than 90 degrees.

4. The detachable guiding mechanism of claim 1, wherein the first angle is greater than the second angle.

5. The detachable guiding mechanism of claim 1, wherein the at least one connecting portion comprises a first connecting portion and a second connecting portion, the at least one fixing portion comprises a first fixing portion and the second fixing portion respectively jointed to the first connecting portion and the second connecting portion.

6. The detachable guiding mechanism of claim 5, wherein the first connecting portion is a locking hole structure, the first fixing portion is a piercing hole structure, the detachable guiding mechanism further comprises a fixing component passing through the locking hole structure and the piercing hole structure to assemble the guiding component with the bridging component.

7. The detachable guiding mechanism of claim 5, wherein the second connecting portion is a slot structure, the second fixing portion is a protruding structure slidably inserting into the slot structure to assemble the guiding component with the bridging component.

8. The detachable guiding mechanism of claim 5, wherein the first connecting portion and the second connecting portion respectively are slot structures, the first fixing portion and the second fixing portion are protruding structures respectively inserting into the corresponding slot structures to assemble the guiding component with the bridging component.

9. The detachable guiding mechanism of claim 5, wherein the fixing surface is adapted to contact the bridging component when the guiding component is assembled with the bridging component.

10. The detachable guiding mechanism of claim 1, wherein the contacting surface, the first guiding surface and the second guiding surface of the guiding component are connected with the bridging component to form a trapezoid shape.

11. The detachable guiding mechanism of claim 10, wherein the guiding component is a solid trapezoid structure or a hollow trapezoid structure formed by connection of the contacting surface, the first guiding surface, the second guiding surface and the fixing surface.

12. An electronic device, comprising:
a casing;
a circuit board disposed inside the casing, at least one expansion card inserting into and being electrically connected to at least one connector of the circuit board selectively, wherein the expansion card is a full-height expansion card or a half-height expansion card;
a fan unit disposed inside the casing and operatively generating airflow inside the casing, the airflow having an inlet direction and an outlet direction;
a detachable guiding mechanism disposed above the expansion card, having a first configuration corresponding to the half-height expansion card and a second configuration corresponding to the full-height expansion card, the detachable guiding mechanism comprising:
a bridging component directly or indirectly disposed on the casing, the bridging component comprising at least one connecting portion, the at least one connecting portion comprising a first connecting portion and a second connecting portion, the first connecting portion being adjacent to the inlet direction and the second connecting portion being adjacent to the outlet direction; and
at least one guiding component detachably assembled with the bridging component, the guiding component comprising:
a contacting surface, the contacting surface being adapted to contact against or abut adjacent to an upper edge of the half-height expansion card when the expansion card equals the half-height expansion card;
a first guiding surface connected to a first side of the contacting surface, a first angle being formed between the first guiding surface and the contacting surface;
a second guiding surface connected to a second side of the contacting surface opposite to the first side, a second angle being formed between the second guiding surface and the contacting surface; and
at least one fixing portion jointed the at least one connecting portion to detachably assemble the guiding component with the bridging component, the at least one fixing portion comprising a first fixing portion and a second fixing portion respectively jointed to the first connecting portion and the second connecting portion;
wherein the guiding component is attached to the bridging component and above the half-height expansion card in the first configuration to block the airflow and further to guide the airflow for passing through a lateral surface of the half-height expansion card so as to increase heat dissipating efficiency of the half-height expansion card, and the guiding component is detached from the bridging component where the full-height expansion card is located in the second configuration.

13. The electronic device of claim 12, wherein the bridging component comprises a plurality of connecting portions arranged in juxtaposition, and the guiding component is selectively disposed on at least one of the plurality of connecting portions located relative to the half-height expansion card.

14. The electronic device of claim 12, wherein the first angle is substantially greater than 90 degrees.

15. The electronic device of claim 12, wherein the first angle is greater than the second angle.

16. The electronic device of claim 12, wherein the first connecting portion is a locking hole structure, the first fixing portion is a piercing hole structure, the detachable guiding mechanism further comprises a fixing component passing through the locking hole structure and the piercing hole structure to assemble the guiding component with the bridging component.

17. The electronic device of claim 12, wherein the second connecting portion is a slot structure, the second fixing portion is a protruding structure slidably inserting into the slot structure to assemble the guiding component with the bridging component.

18. The electronic device of claim 12, wherein the first connecting portion and the second connecting portion respectively are slot structures, the first fixing portion and the second fixing portion are protruding structures respectively inserting into the corresponding slot structures to assemble the guiding component with the bridging component.

19. The electronic device of claim 12, wherein the guiding component further comprises a fixing surface opposite to the contacting surface, the fixing surface is adapted to contact the bridging component when the guiding component is assembled with the bridging component.

20. The electronic device of claim 19, wherein the bridging component further comprises a third connecting portion, the guiding component further comprises at least one constraining portion disposed on the fixing surface, the at least one constraining portion is jointed to the third connecting portion to detachably assemble the guiding component with the bridging component.

21. The electronic device of claim 12, wherein the contacting surface, the first guiding surface and the second guiding surface of the guiding component are connected with the bridging component to form a trapezoid shape.

22. The electronic device of claim 21, wherein the guiding component comprises a fixing surface opposite to the contacting surface, the guiding component is a solid trapezoid structure or a hollow trapezoid structure formed by connection of the contacting surface, the first guiding surface, the second guiding surface and the fixing surface.

23. The electronic device of claim 21, wherein the guiding component is a striped structure formed by connection of the contacting surface, the first guiding surface and the second guiding surface.

24. The electronic device of claim 12, wherein the bridging component is independent from or monolithically integrated with the casing.

25. A detachable guiding mechanism selectively disposed inside an electronic device and accordingly located above at least one half-height expansion card or full-height expansion card of the electronic device, the detachable guiding mechanism comprising:

a bridging component, the bridging component comprising at least one connecting portion; and at least one guiding component detachably assembled with the bridging component to form a first configuration and a second configuration of the detachable guiding mechanism, the guiding component comprising:

a contacting surface, the contacting surface being adapted to contact against or abut adjacent to an upper edge of the half-height expansion card when the detachable guiding mechanism is located above the half-height expansion card;

a first guiding surface connected to a first side of the contacting surface, a first angle being formed between the first guiding surface and the contacting surface;

a second guiding surface connected to a second side of the contacting surface opposite to the first side, a second angle being formed between the second guiding surface and the contacting surface; and at least one fixing portion jointed to the at least one connecting portion to detachably assemble the guiding component with the bridging component;

wherein the guiding component is attached to the bridging component and above the half-height expansion card in the first configuration, and the guiding component is detached from the bridging component where the full-height expansion card is located in the second configuration, and the guiding component is a striped structure formed by connection of the contacting surface, the first guiding surface and the second guiding surface.

26. An electronic device, comprising:

a casing;

a circuit board disposed inside the casing, at least one expansion card inserting into and being electrically connected to at least one connector of the circuit board selectively, wherein the expansion card is a full-height expansion card or a half-height expansion card;

a fan unit disposed inside the casing and operatively generating airflow inside the casing, the airflow having an inlet direction and an outlet direction;

a detachable guiding mechanism disposed above the expansion card, having a first configuration corresponding to the half-height expansion card and a second configuration corresponding to the full-height expansion card, the detachable guiding mechanism comprising:

a bridging component directly or indirectly disposed on the casing, the bridging component comprising at least one connecting portion; and at least one guiding component detachably assembled with the bridging component, the guiding component comprising:

a contacting surface, the contacting surface being adapted to contact against or abut adjacent to an upper edge of the half-height expansion card when the expansion card equals the half-height expansion card;

a first guiding surface connected to a first side of the contacting surface, a first angle being formed between the first guiding surface and the contacting surface;

a second guiding surface connected to a second side of the contacting surface opposite to the first side, a second angle being formed between the second guiding surface and the contacting surface; and at least one fixing portion jointed the at least one connecting portion to detachably assemble the guiding component with the bridging component;

wherein the guiding component is attached to the bridging component and above the half-height expansion card in the first configuration to block the airflow and further to guide the airflow for passing through a lateral surface of the half-height expansion card so as to increase heat dissipating efficiency of the half-height expansion card, and the guiding component is detached from the bridging component where the full-height expansion card is located in the second configuration, the guiding component is a striped structure formed by connection of the contacting surface, the first guiding surface and the second guiding surface.

\* \* \* \* \*